United States Patent
Calcaterra et al.

(10) Patent No.: US 11,425,222 B2
(45) Date of Patent: Aug. 23, 2022

(54) DYNAMICALLY MANAGING DATA SHARING

(71) Applicant: International Business Machines Corporation, Armonk, NY (US)

(72) Inventors: Jeffrey A. Calcaterra, Chapel Hill, NC (US); Romelia H. Flores, Keller, TX (US); Zhi Li Guan, Beijing (CN); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 15/418,492

(22) Filed: Jan. 27, 2017

(65) Prior Publication Data
US 2018/0219938 A1    Aug. 2, 2018

(51) Int. Cl.
*H04L 67/50*     (2022.01)
*G06F 21/62*     (2013.01)
*G06F 21/31*     (2013.01)
*H04L 67/62*     (2022.01)

(52) U.S. Cl.
CPC .......... *H04L 67/535* (2022.05); *G06F 21/316* (2013.01); *G06F 21/6218* (2013.01); *H04L 67/62* (2022.05)

(58) Field of Classification Search
CPC .............. G06F 16/9535; G06F 3/0482; G06F 16/1837; G06F 16/2428; G06F 16/24575;
(Continued)

(56) References Cited

U.S. PATENT DOCUMENTS 7,644,144 B1 * 1/2010 Horvitz ................ G06Q 10/10
709/223
7,675,873 B2 * 3/2010 Krstulich ............ H04M 3/4872
370/260
(Continued)

FOREIGN PATENT DOCUMENTS

CN    103440571 A    12/2013
CN    104834967 A    8/2015
(Continued)

OTHER PUBLICATIONS

Byun et al., "Harnessing Context to Support Proactive Behaviours," 2013, pp. 1-8, Retrieved From cvs.cs.umd.edu/class/spring2013/cmsc818g/files/harnessingcontext.pdf.
(Continued)

*Primary Examiner* — Kamal B Divecha
*Assistant Examiner* — Sandarva Khanal
(74) *Attorney, Agent, or Firm* — Zilka-Kotab, P.C.

(57) ABSTRACT

A computer-implemented method according to one embodiment includes identifying an event, utilizing a server device, determining a match between the event and an historical event, utilizing the server device, identifying historical data sharing behavior associated with the historical event, utilizing the server device, determining, by the server device, one or more data sharing actions to be performed during the event, utilizing the historical data sharing behavior, and automatically implementing the one or more data sharing actions in response to an initialization of the event, utilizing the server device.

23 Claims, 10 Drawing Sheets

(58) Field of Classification Search
CPC .... G06F 16/248; G06F 16/275; G06F 16/284;
G06F 16/285; G06F 16/3331; G06F
16/40; G06F 16/447; G06F 16/951; G06F
16/954; G06F 17/248; G06F 3/04842;
G06F 8/61; G06F 8/65; G06F 21/316;
G06F 21/6218; G06Q 10/1095; G06Q
50/01; G06Q 10/1093; G06Q 10/00;
G06Q 10/02; G06Q 10/063118; G06Q
10/06313; G06Q 10/10; G06Q 10/103;
G06Q 20/10; G06Q 20/1235; G06Q
20/145; G06Q 20/322; G06Q 30/02;
G06Q 30/0243; G06Q 30/0249; G06Q
30/0251; G06Q 30/0255; G06Q 30/0269;
G06Q 30/0282; G06Q 50/184; H04L
12/1822; H04L 51/04; H04L 51/046;
H04L 51/32; H04L 67/22; H04L 67/306;
H04L 12/18; H04L 12/1813; H04L
12/1818; H04L 2209/16; H04L 51/066;
H04L 51/14; H04L 51/16; H04L 51/28;
H04L 63/0227; H04L 63/061; H04L
65/403; H04L 67/02; H04L 67/10; H04L
67/104; H04L 67/1074; H04L 67/18;
H04L 67/26; H04L 67/325; H04L 67/34;
H04L 9/0822; H04L 9/0833; H04W 4/60;
Y10S 707/963; Y10S 707/99932; Y10S
707/99933; Y10S 707/99935; Y10S
715/962; Y10S 715/963
See application file for complete search history.

(56) References Cited

U.S. PATENT DOCUMENTS

| | | | |
|---|---|---|---|
| 7,856,473 B2 | 12/2010 | Horikiri et al. | |
| 7,991,764 B2 | 8/2011 | Rathod | |
| 8,140,619 B2 | 3/2012 | Lyle et al. | |
| 8,166,019 B1 | 4/2012 | Lee et al. | |
| 8,824,684 B2 | 9/2014 | Calcaterra et al. | |
| 9,264,246 B2 | 2/2016 | Li | |
| 9,317,825 B2 | 4/2016 | Defusco et al. | |
| 9,785,915 B2 | 10/2017 | Defusco et al. | |
| 9,954,945 B2 | 4/2018 | Abou Mahmoud et al. | |
| 10,037,512 B2 | 7/2018 | White et al. | |
| 10,484,480 B2 | 11/2019 | Calcaterra et al. | |
| 11,019,153 B2 | 5/2021 | Calcaterra et al. | |
| 2001/0005847 A1 | 6/2001 | Wachtel | |
| 2003/0069828 A1* | 4/2003 | Blazey | G06Q 10/10 705/37 |
| 2004/0008249 A1* | 1/2004 | Nelson | H04N 7/147 348/14.09 |
| 2006/0002315 A1* | 1/2006 | Theurer | H04L 67/1095 370/261 |
| 2006/0294043 A1* | 12/2006 | Taisdeal | G06Q 10/109 |
| 2007/0029380 A1* | 2/2007 | Keohane | H04W 4/029 235/382 |
| 2007/0060107 A1* | 3/2007 | Day | H04M 1/72454 455/414.1 |
| 2008/0226050 A1* | 9/2008 | Leppisaari | G06Q 10/10 379/202.01 |
| 2008/0282356 A1* | 11/2008 | Grabarnik | G06F 21/84 726/26 |
| 2008/0313550 A1* | 12/2008 | Shiga | G06Q 10/107 715/753 |
| 2009/0150194 A1* | 6/2009 | Keohane | H04W 4/021 705/5 |
| 2009/0319913 A1* | 12/2009 | Serr | H04L 12/1818 715/753 |
| 2010/0042704 A1* | 2/2010 | Chakra | G06Q 10/109 709/221 |
| 2010/0080374 A1* | 4/2010 | Hepworth | H04M 3/42365 379/202.01 |
| 2010/0251142 A1* | 9/2010 | Geppert | G06F 3/04842 715/758 |
| 2011/0080422 A1* | 4/2011 | Lee | G06F 1/3203 345/589 |
| 2012/0023165 A1 | 1/2012 | Li | |
| 2012/0036452 A1* | 2/2012 | Coleman | G06F 21/55 715/751 |
| 2012/0185803 A1* | 7/2012 | Wang | G06F 3/04817 715/847 |
| 2013/0007895 A1* | 1/2013 | Brolley | G06F 21/62 726/28 |
| 2013/0212182 A1* | 8/2013 | Jhang | H04L 65/403 709/205 |
| 2013/0238423 A1* | 9/2013 | Pottjegort | G06Q 30/0246 705/14.45 |
| 2013/0279678 A1* | 10/2013 | Beerse | H04M 3/2227 379/202.01 |
| 2014/0020047 A1* | 1/2014 | Liebmann | H04L 63/20 726/1 |
| 2014/0108333 A1* | 4/2014 | Jain | H04L 67/22 707/609 |
| 2014/0172967 A1* | 6/2014 | Yeung | H04L 12/1822 709/204 |
| 2014/0215356 A1* | 7/2014 | Brander | G06F 21/84 715/753 |
| 2014/0226537 A1* | 8/2014 | Kashimba | H04L 65/4038 370/261 |
| 2014/0304023 A1* | 10/2014 | Li | G06Q 10/1097 705/7.21 |
| 2014/0351345 A1 | 11/2014 | Arroyo et al. | |
| 2014/0379405 A1* | 12/2014 | Herger | H04L 41/5006 705/7.19 |
| 2015/0033153 A1 | 1/2015 | Knysz et al. | |
| 2015/0058324 A1 | 2/2015 | Kauwe | |
| 2015/0205595 A1* | 7/2015 | Dudai | G06F 8/71 717/168 |
| 2015/0278534 A1* | 10/2015 | Thiyagarajan | G06F 21/84 726/28 |
| 2015/0347980 A1* | 12/2015 | White | G06Q 10/1095 705/7.19 |
| 2015/0347982 A1* | 12/2015 | Jon | G06F 3/0484 705/7.19 |
| 2015/0347985 A1 | 12/2015 | Gross et al. | |
| 2016/0148167 A1* | 5/2016 | Li | G06Q 10/10 705/7.19 |
| 2016/0247123 A1 | 8/2016 | Holst et al. | |
| 2016/0247124 A1 | 8/2016 | Holst et al. | |
| 2016/0381163 A1* | 12/2016 | Mashtakov | H04L 67/1097 709/205 |
| 2017/0010769 A1 | 1/2017 | Gross et al. | |
| 2017/0011354 A1 | 1/2017 | Gross et al. | |
| 2017/0011355 A1 | 1/2017 | Gross et al. | |
| 2017/0093780 A1* | 3/2017 | Lieb | G06F 16/58 |
| 2017/0118271 A1* | 4/2017 | Reyes | H04L 67/06 |
| 2017/0188183 A1* | 6/2017 | Lihosit | H04W 40/244 |
| 2017/0200128 A1* | 7/2017 | Kumahara | G06Q 50/01 |
| 2017/0308866 A1* | 10/2017 | Dotan-Cohen | H04L 43/0876 |
| 2018/0025325 A1 | 1/2018 | Bosko et al. | |
| 2018/0046957 A1 | 2/2018 | Yaari et al. | |
| 2018/0103073 A1 | 4/2018 | Rosenberg et al. | |
| 2018/0103074 A1 | 4/2018 | Rosenberg | |
| 2018/0219691 A1 | 8/2018 | Calcaterra et al. | |
| 2020/0028918 A1 | 1/2020 | Calcaterra et al. | |

FOREIGN PATENT DOCUMENTS

CN 103731559 B 3/2016
WO 2015032119 A1 3/2015

OTHER PUBLICATIONS

Dong et al., "A Proactive Cloud Management Architecture for Private Clouds," IEEE Sixth International Conference an Cloud Computing, 2013, pp. 1-8.

(56) References Cited

OTHER PUBLICATIONS

Anonymous, "Systems and Methods for Monitoring in Real-time and Assessing with Historical Information Technology Availability and Performance," ip.com, Nov. 16, 2007, pp. 1-14.
Anonymous, "Software Application Integration Framework (SAIF) Flexible Configuration," ip.com, May 27, 2011, pp. 1-5.
Non-Final Office Action from U.S. Appl. No. 15/418,521, dated Jan. 11, 2019.
Calcaterra et al., U.S. Appl. No. 15/418,521, filed Jan. 27, 2017.
List of IBM Patents or Patent Applications Treated as Related.
Corrected Notice of Allowance from U.S. Appl. No. 15/418,521, dated Jul. 3, 2019.
Notice of Allowance from U.S. Appl. No. 15/418,521, dated Jul. 17, 2019.
Notice of Allowance from U.S. Appl. No. 15/418,521, dated May 16, 2019.
Calcaterra et al., U.S. Appl. No. 16/584,694, filed Sep. 26, 2019.
Non-Final Office Action from U.S. Appl. No. 16/584,694, dated Jun. 8, 2020.
Final Office Action from U.S. Appl. No. 16/584,694, dated Aug. 24, 2020.
Notice of Allowance from U.S. Appl. No. 16/584,694, dated Oct. 23, 2020.
Notice of Allowance from U.S. Appl. No. 16/584,694, dated Jan. 19, 2021.

\* cited by examiner

DYNAMICALLY MANAGING DATA SHARING

BACKGROUND

The present invention relates to data sharing and data security, and more specifically, this invention relates to dynamically adjusting one or more aspects of data sharing within a computing environment in response to monitored behavior.

Modern day business activities commonly utilize various types of data sharing. For example, enterprise collaboration tools may be used by project teams to share documents, device screen captures, and other data between users during the course of business. However, current methods for performing data sharing have various limitations. For example, incorrect users may be given access to shared data through user error (e.g., a user forgetting to log out of a data sharing application, a user inviting an incorrect user to an online meeting where data is shared, etc.).

SUMMARY

A computer-implemented method according to one embodiment includes identifying an event, utilizing a server device, determining a match between the event and an historical event, utilizing the server device, identifying historical data sharing behavior associated with the historical event, utilizing the server device, determining, by the server device, one or more data sharing actions to be performed during the event, utilizing the historical data sharing behavior, and automatically implementing the one or more data sharing actions in response to an initialization of the event, utilizing the server device.

According to another embodiment, a computer program product for managing dynamic data sharing comprises a computer readable storage medium having program instructions embodied therewith, where the computer readable storage medium is not a transitory signal per se, and where the program instructions are executable by a processor to cause the processor to perform a method comprising identifying an event, utilizing the processor, determining a match between the event and an historical event, utilizing the processor, identifying historical data sharing behavior associated with the historical event, utilizing the processor, determining, utilizing the processor, one or more data sharing actions to be performed during the event, utilizing the historical data sharing behavior, and automatically implementing the one or more data sharing actions in response to an initialization of the event, utilizing the processor.

A system according to another embodiment includes a processor, and logic integrated with the processor, executable by the processor, or integrated with and executable by the processor, where the logic is configured to identify an event, determine a match between the event and an historical event, identify historical data sharing behavior associated with the historical event, determine one or more data sharing actions to be performed during the event, utilizing the historical data sharing behavior, and automatically implement the one or more data sharing actions in response to an initialization of the event.

According to another embodiment, a computer-implemented method includes presenting, by a client device to a user, an option to initialize an event, receiving by the client device a selection of the option to initialize the event, sending, from the client device to a server, a notification that the event has been initialized, in response to the notification, receiving at the client device from the server one or more data sharing actions to be performed during the event, performing the one or more data sharing actions by the client device during the event, presenting by the client device to the user an option to complete the event, receiving by the client device a selection of the option to complete the event, sending from the client device to the server a notification that the event has been completed, receiving at the client device from the server one or more completion actions to be performed, and performing, by the client device, the one or more completion actions.

According to another embodiment, a computer-implemented method includes identifying, at a client device, an initialization of an event, monitoring, by the client device, data sharing actions during the event, and sending, by the client device to a server device, characteristics of the event and the data sharing actions.

Other aspects and embodiments of the present invention will become apparent from the following detailed description, which, when taken in conjunction with the drawings, illustrate by way of example the principles of the invention.

DETAILED DESCRIPTION

Figure 1:
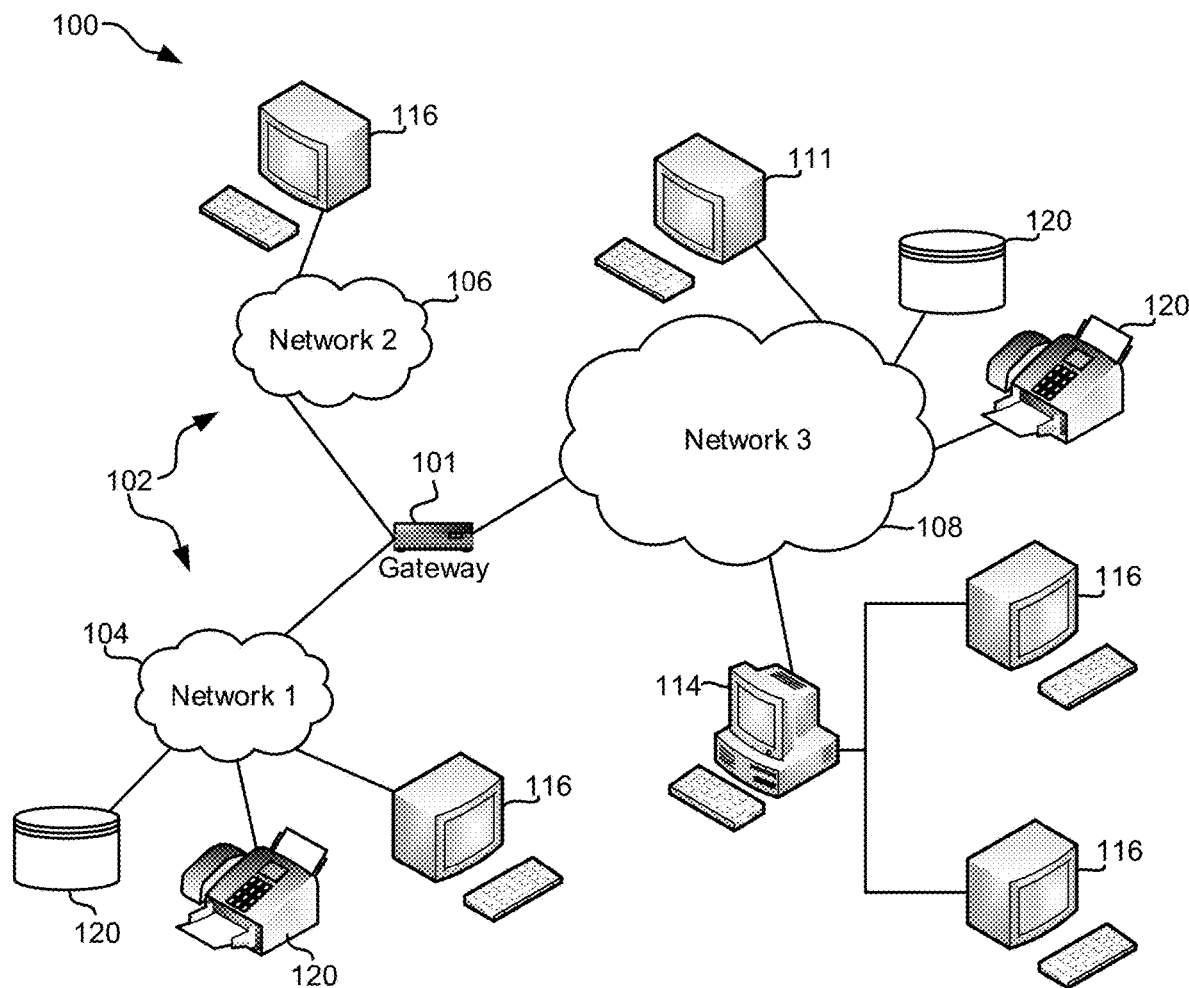
FIG. 1 illustrates a network architecture, in accordance with one embodiment.

The following description discloses several preferred embodiments of systems, methods and computer program products for dynamically managing data sharing. Various embodiments provide a method to match future events to historical data sharing events and automatically implement one or more data sharing actions based on an analysis of the historical data sharing events.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamically managing data sharing.

In one general embodiment, a computer-implemented method includes identifying an event, utilizing a server device, determining a match between the event and an historical event, utilizing the server device, identifying historical data sharing behavior associated with the historical event, utilizing the server device, determining, by the server device, one or more data sharing actions to be performed during the event, utilizing the historical data sharing behavior, and automatically implementing the one or more data sharing actions in response to an initialization of the event, utilizing the server device.

In another general embodiment, a computer program product for managing dynamic data sharing comprises a computer readable storage medium having program instructions embodied therewith, where the computer readable storage medium is not a transitory signal per se, and where the program instructions are executable by a processor to cause the processor to perform a method comprising identifying an event, utilizing the processor, determining a match between the event and an historical event, utilizing the processor, identifying historical data sharing behavior associated with the historical event, utilizing the processor, determining, utilizing the processor, one or more data sharing actions to be performed during the event, utilizing the historical data sharing behavior, and automatically implementing the one or more data sharing actions in response to an initialization of the event, utilizing the processor.

In another general embodiment, a system includes a processor, and logic integrated with the processor, executable by the processor, or integrated with and executable by the processor, where the logic is configured to identify an event, determine a match between the event and an historical event, identify historical data sharing behavior associated with the historical event, determine one or more data sharing actions to be performed during the event, utilizing the historical data sharing behavior, and automatically implement the one or more data sharing actions in response to an initialization of the event.

In another general embodiment, a computer-implemented method includes presenting, by a client device to a user, an option to initialize an event, receiving by the client device a selection of the option to initialize the event, sending, from the client device to a server, a notification that the event has been initialized, in response to the notification, receiving at the client device from the server one or more data sharing actions to be performed during the event, performing the one or more data sharing actions by the client device during the event, presenting by the client device to the user an option to complete the event, receiving by the client device a selection of the option to complete the event, sending from the client device to the server a notification that the event has been completed, receiving at the client device from the server one or more completion actions to be performed, and performing, by the client device, the one or more completion actions.

In another general embodiment, a computer-implemented method includes identifying, at a client device, an initialization of an event, monitoring, by the client device, data sharing actions during the event, and sending, by the client device to a server device, characteristics of the event and the data sharing actions.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
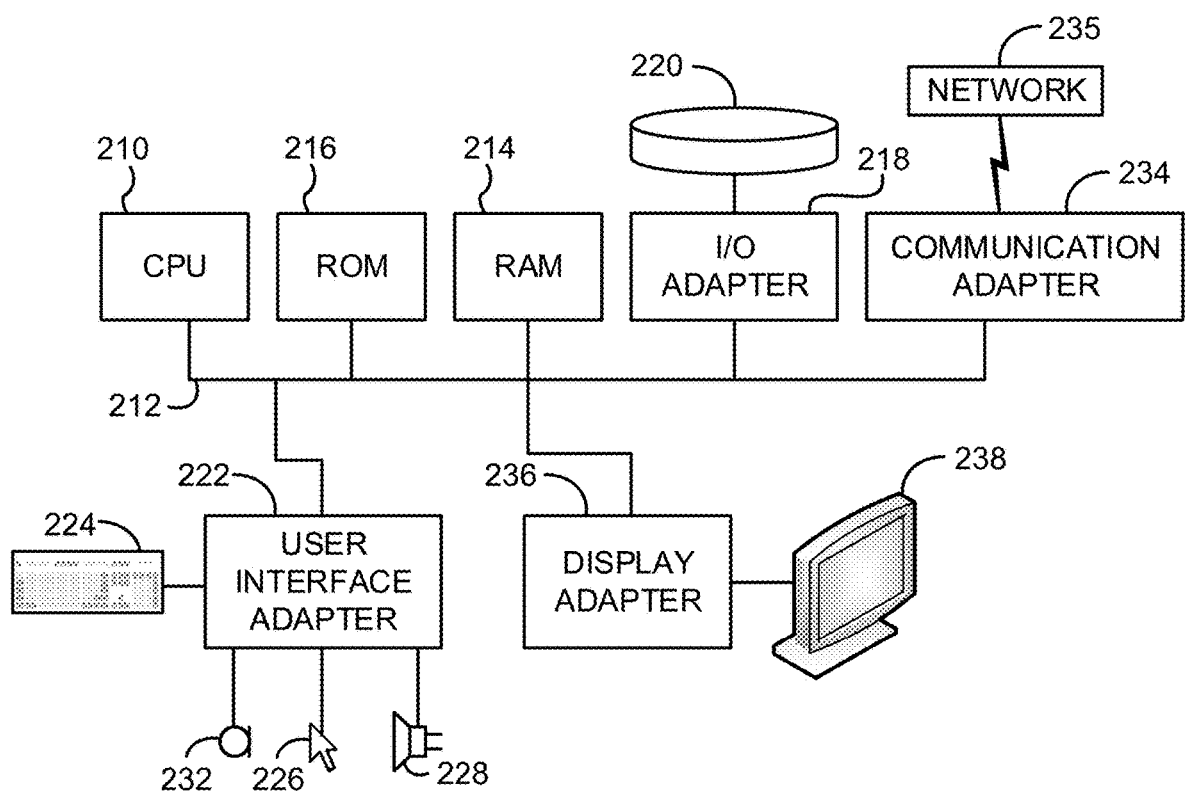
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
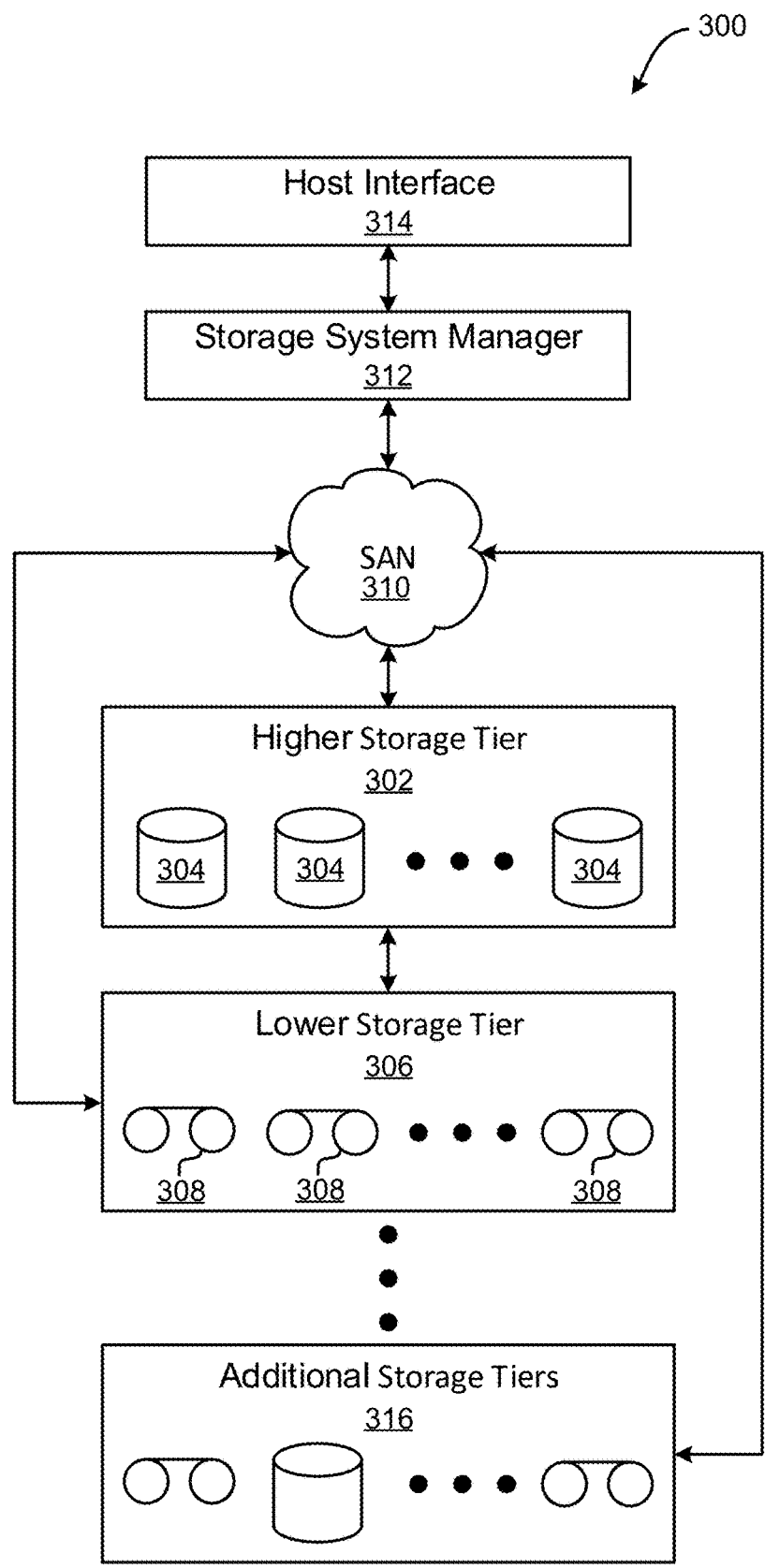
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
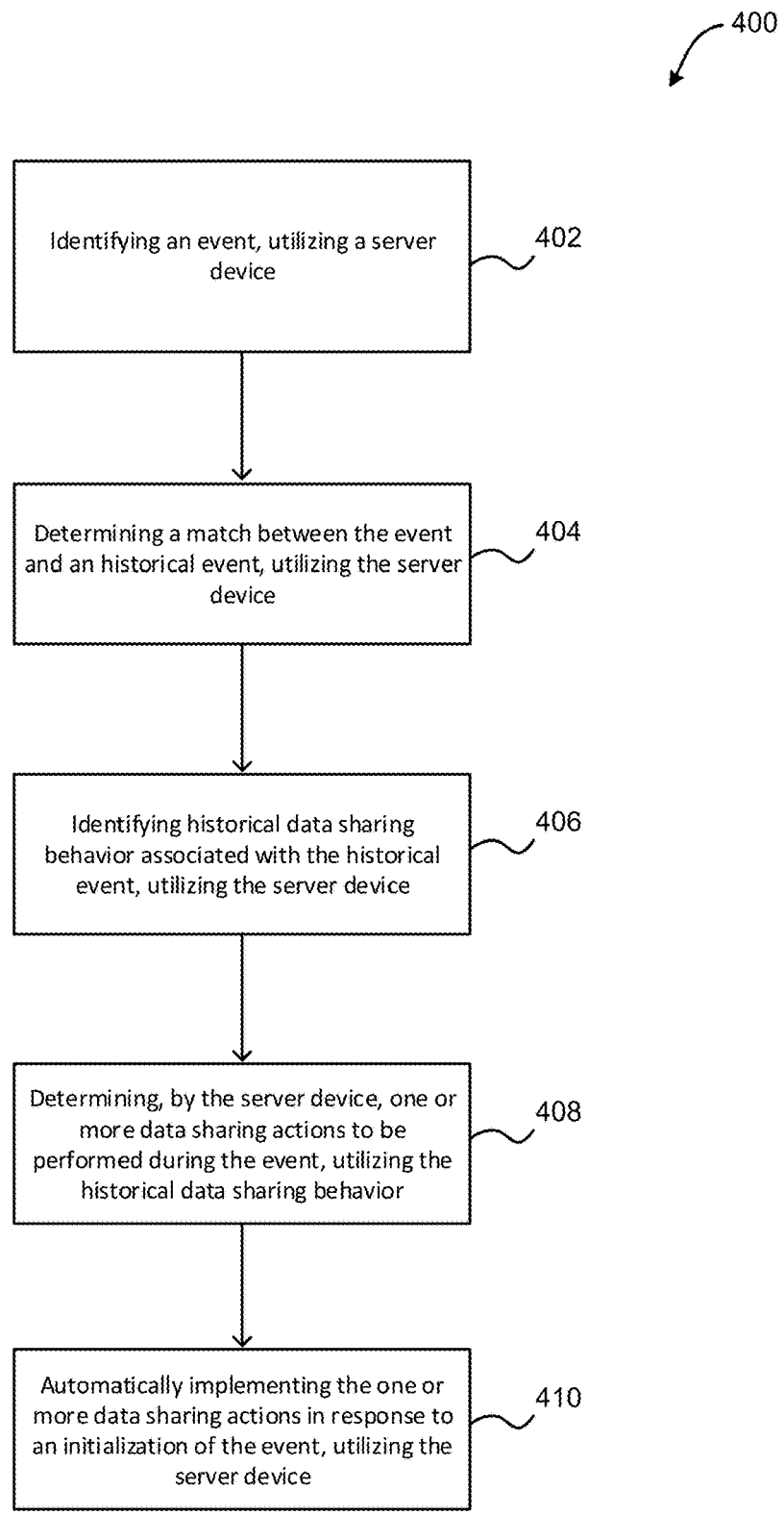
FIG. 4 illustrates a method for dynamically managing data sharing, in accordance with one embodiment.

Now referring to FIG. 4, a flowchart of a method 400 is shown according to one embodiment. The method 400 may be performed in accordance with the present invention in any of the environments depicted in FIGS. 1-3 and 8-10, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where an event is identified. In one embodiment, the event may include an event that is scheduled to occur at a future time. In another embodiment, the event may include a meeting of one or more users. For example, the event may include a team and/or project meeting, a technical discussion, a review involving one or more users, etc. In yet another embodiment, the event may by initiated by one or more users (e.g., hosts of the event, etc.), and may have one or more additional users participating in the event (e.g., as guests, etc.).

Additionally, in one embodiment, the event may be identified by monitoring one or more applications. For example, the event may be identified by monitoring a calendar application of one or more users. In another embodiment, the event may be identified by one or more server devices. For example, the event may be monitored by one or more hardware servers, one or more modules within a hardware server environment, etc. In another example, the one or more server devices may be included within a server framework, and may include one or more APIs, one or more applications, etc.

Further, as shown in FIG. 4, method 400 may proceed with operation 404, where a match between the event and an historical event is determined. In one embodiment, determining the match may include identifying one or more characteristics of the event. For example, the event may be analyzed to determine one or more of a date that the event is to occur, a time that the event is to occur, a location where the event is to occur, one or more users attending the event, etc.

Further still, in one embodiment, determining the match may include comparing the one or more characteristics of the event to one or more characteristics of a plurality of stored historical events. In another embodiment, the one or more historical events may be received (e.g., from one or more client devices, etc.) as a result of one or more monitoring actions. In yet another embodiment, the received historical events may be analyzed in order to determine the one or more characteristics. In still another embodiment, the received historical events and associated characteristics may be locally or remotely stored (e.g., in one or more databases, etc.).

Also, in one embodiment, a match may be determined between the event and the historical event when a predetermined number of characteristics of the event match a predetermined number of characteristics of one of the plurality of stored historical events. In another embodiment, a match may be determined between the event and a plurality of historical events. In yet another embodiment, the match may be determined by the one or more devices that identified the event.

In addition, as shown in FIG. 4, method 400 may proceed with operation 406, where historical data sharing behavior associated with the historical event is identified. In one embodiment, the historical data sharing behavior may include behavior occurring during the historical event that affected data being shared between users participating in the event. In another embodiment, the data sharing behavior may include the instantiation/running of one or more applications. For example, the one or more applications may be used facilitate a meeting environment (e.g., enterprise collaboration, a web conference, a meeting application, a chat group, an image/audio/textual communication, etc.) during the historical event.

Furthermore, in another example, the data sharing behavior may include the creation of an instance of a meeting application in order to conduct a meeting with a plurality of users. In another example, the data sharing behavior may include one or more of launching one or more applications, opening one or more applications, logging in to one or more applications, etc.

Further still, in one embodiment, the historical data sharing behavior may include an invitation of one or more additional users to participate in the historical event. For example, the historical data sharing behavior may include one or more requests to invite one or more users, where the requests are made via one or more of an email application, a calendar application, a meeting application, a text messaging application, etc. In another embodiment, the data sharing behavior may include the creation of a data sharing group that includes one or more users (e.g., where a data sharing group may be created within a data sharing application, etc.).

Also, in one embodiment, the historical data sharing behavior may include the sharing of predetermined data with one or more users. For example, the historical data sharing behavior may include the running of one or more applications that facilitate the sharing of data (e.g., a file sharing application, a meeting application, a screen capture sharing application, etc.) and sharing predetermined data with one or more users using the one or more applications. In another example, the historical data sharing behavior may include enabling and/or altering one or more security settings within one or more data sharing applications.

Additionally, in one embodiment, the historical data sharing behavior may include the terminating of one or more applications (e.g., at a conclusion of the historical event, at a predetermined time within the historical event, etc.). For example, the historical data sharing behavior may include a closing one or more meeting applications, one or more file sharing applications, etc. at the end of a meeting. In another example, the historical data sharing behavior may include the termination of one or more applications or windows of a user interface (e.g., sensitive communications applications, sensitive emails, etc.) at a start of the historical event.

Further, in one embodiment, the historical data sharing behavior may be performed by one or more users associated with the historical event. For example, the historical data sharing behavior may be performed by one or more user participants in a historical meeting. In another embodiment, the historical data sharing behavior may be received (e.g., from one or more client devices, etc.) as a result of one or more monitoring actions. For example, a client device may monitor and identify one or more characteristics of the historical event, along with historical data sharing behavior performed during the historical event. The client device may then send this information to a server device for analysis and storage at the server device (and/or at a remote storage device).

Further still, in one embodiment, the historical data sharing behavior may be stored in association with the historical event. For example, the historical data sharing behavior may be linked to the historical event during storage. In another embodiment, one or more profiles may be created for one or more users, where the profiles may include the historical event (e.g., as one of a plurality of historical events, etc.) as well as linked historical data sharing behavior associated with the historical event. In yet another embodiment, the historical data sharing behavior may be determined by the one or more devices that determined the match between the event and an historical event.

Also, as shown in FIG. 4, method 400 may proceed with operation 408, where one or more data sharing actions to be performed during the event are determined, utilizing the historical data sharing behavior. In one embodiment, the one or more data sharing actions may include inviting one or more users to the event. For example, the historical data sharing behavior may indicate a plurality of users who were invited to the historical event, and the one or more users invited to the event may be selected based on the plurality of users invited to the historical event. For instance, at least a subset of the plurality of users invited to the historical event may be invited to the event.

In addition, in one embodiment, a group (e.g., a list, etc.) of users to invite to the event may be determined. In another embodiment, a security level associated with each user on the list may be compared to a threshold security level in order to determine whether to invite the user to the event.

Furthermore, in one embodiment, the one or more sharing actions may include sharing data during the event. For example, the historical data sharing behavior may indicate data shared during the historical event, and the data to be shared during the event may be selected based on the data shared during the historical event. For instance, at least a subset of the data shared during the historical event may be shared during the event. In another embodiment, the data to be shared may include one or more of screenshot data, file data, document data, etc.

Further still, in one embodiment, the one or more sharing actions may include initializing/running one or more applications during the event. For example, the historical data sharing behavior may indicate applications that were run during the historical event, and the applications to be run during the event may be selected based on the applications run during the historical event. For instance, at least a subset of the applications run during the historical event may be run during the event. In another embodiment, a time to run one or more of the applications may be determined, based on times that the applications were run during the historical event.

Also, in one embodiment, the one or more sharing actions may include stopping/terminating one or more actions during the event. For example, the historical data sharing behavior may indicate applications that were terminated during the historical event, and the applications to be terminated during the event may be selected based on the applications terminated during the historical event. For instance, at least a subset of the applications terminated during the historical event may be terminated during the event. In another embodiment, a time to terminate one or more of the applications (e.g., at a start of the event, at a conclusion of the event, at a predetermined time during the event, etc.) may be determined, based on times that the applications were terminated during the historical event.

Additionally, in one embodiment, the one or more sharing actions may include selectively removing one or more users from one or more portions of the event. For example, the historical data sharing behavior may indicate one or more users that were removed from one or more portions of the historical event, and the users to be removed during the event may be selected based on the users removed during the historical event. For instance, at least a subset of the users removed during the historical event may be removed during the event (e.g., at similar times during the event, etc.). In another embodiment, the one or more users may be selectively removed from one or more portions of the event by selectively muting one or more users during the event, altering one or more user access levels during the event, etc.

Further, in one embodiment, the one or more data sharing actions to be performed during the event may be determined by the by the one or more devices that determined the historical sharing behavior. In another embodiment, the one or more data sharing actions to be performed during the event may be saved and correlated to the meeting within one or more databases.

Further still, as shown in FIG. 4, method 400 may proceed with operation 410, where the one or more data sharing actions are implemented automatically in response to an initialization of the event. In one embodiment, the initialization of the event may occur in response to a detection of one or more actions by a user (e.g., a selection of an icon by the user, etc.). For example, a client device may notify one or more server devices that the user has selected an icon within a graphical user interface (GUI). In another embodiment, the initialization of the event may occur automatically (e.g., according to a schedule, a calendar, etc.).

Also, in one embodiment, automatically implementing the one or more data sharing actions may include one or more of automatically inviting one or more users to the event, sharing predetermined data during the event, running one or more applications during the event, terminating one or more applications during the event, etc. In another embodiment, automatically implementing the one or more data sharing actions may include sending one or more instructions from one or more server devices to one or more client devices during the event. For example, the one or more server devices may send to the one or more client devices instructions to run an application at a client device, make data available for sharing at a client device, etc. In another example, the one or more server devices may send to the one or more client devices instructions to display to a user one or more options within a GUI (e.g., one or more selectable icons to perform predetermined actions, etc.).

In addition, in one embodiment, the event may be monitored. For example, one or more client devices may monitor data sharing behavior during the event (e.g., in response to instructions from the server, etc.) and may report such data sharing behavior to one or more server devices, where such data sharing behavior may be saved in association with characteristics of the event.

In this way, data sharing actions may be dynamically controlled during the occurrence of an event, according to an analysis of historical data sharing. This may improve data security by ensuring that appropriate users have access to shared data at appropriate times.

Figure 5:
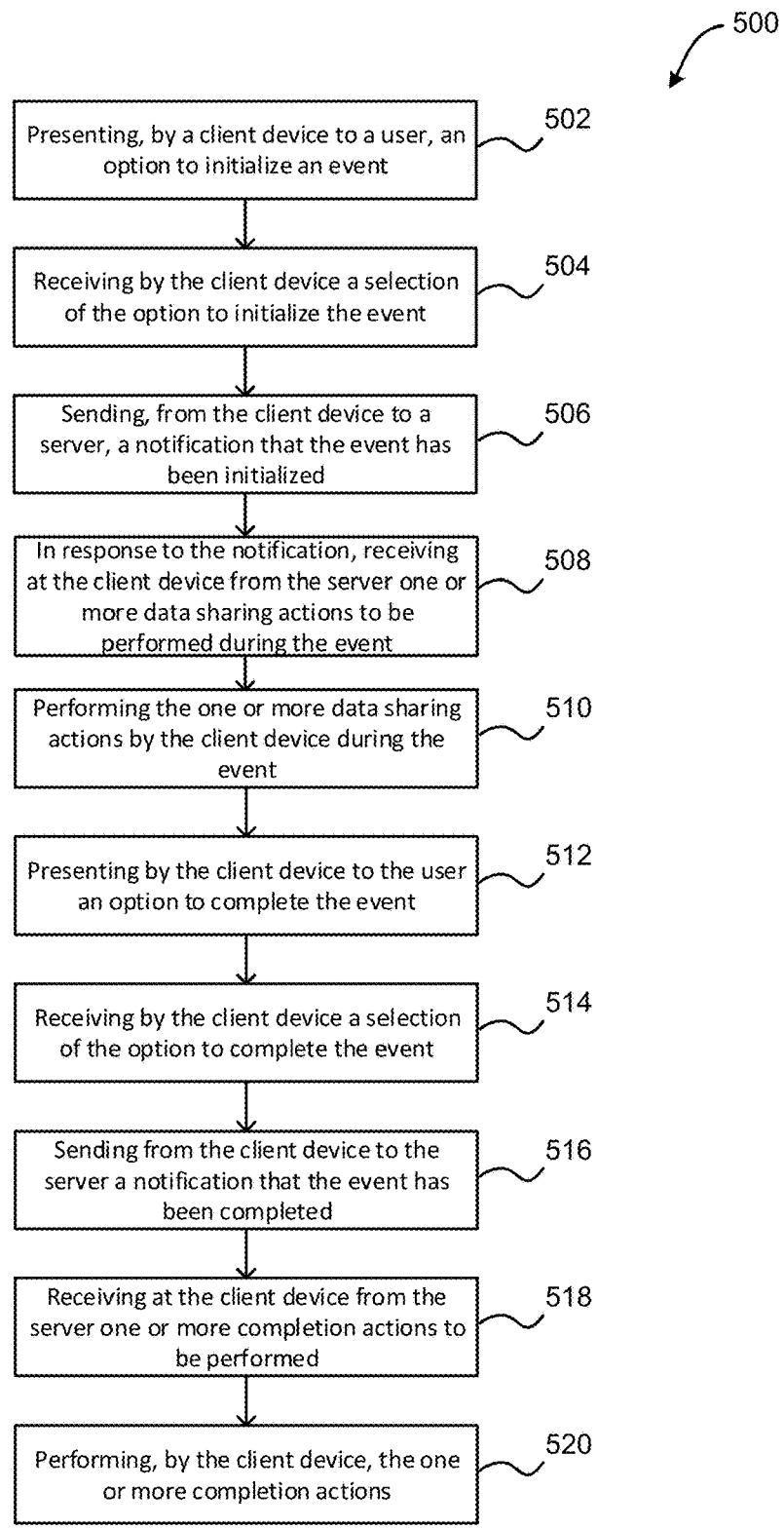
FIG. 5 illustrates a method for performing one or more data sharing actions at a client device, in accordance with one embodiment.

Now referring to FIG. 5, a flowchart of a method 500 for performing one or more data sharing actions at a client device is shown according to one embodiment. The method 500 may be performed in accordance with the present invention in any of the environments depicted in FIGS. 1-3 and 8-10, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where an option to initialize an event is presented by a client device to a user. In one embodiment, the client device may include a computing device such as a desktop computer or laptop computer, a mobile computing device such as a cell phone, etc. In one embodiment, the option may be presented as a selectable icon within a GUI.

Additionally, method 500 may proceed with operation 504, where a selection of the option to initialize the event is received by the client device. For example, a selection of the icon within the GUI by a user may be received. Further, method 500 may proceed with operation 506, where a notification that the event has been initialized is sent from the client device to a server.

Further still, method 500 may proceed with operation 508, where one or more data sharing actions to be performed during the event are received at the client device from the server in response to the notification. For example, one or more instructions to run one or more applications may be received from the server, one or more instructions to invite one or more users may be received from the server, etc.

Also, method 500 may proceed with operation 510, where the one or more data sharing actions are performed by the client device during the event. For example, one or more applications may be run, one or more users may be invited to participate in the event, one or more data elements may be made available for sharing, etc. In one embodiment, additional functionality may also be performed during the event. For example, an automated alert may be sent to one or more users (e.g., when a meeting is running over, etc.). In another example, a notification may be sent to one or more users participating in another event.

In addition, method 500 may proceed with operation 512, where an option to complete the event is presented by the client device to the user. In one embodiment, the option may be presented as a selectable icon within a GUI. In another embodiment, the option may be presented to the user in response to an instruction (e.g., from the server, etc.). In yet another embodiment, the option may include an option to initialize a different event.

Furthermore, method 500 may proceed with operation 514, where a selection of the option to complete the event is received by the client device. Further still, method 500 may proceed with operation 516, where a notification that the event has been completed is sent from the client device to the server. Also, method 500 may proceed with operation 518, where one or more completion actions to be performed are received at the client device from the server.

For example, the one or more completion actions may include one or more of closing/logging out of one or more applications, changing one or more security settings, removing one or more users from participating in an application, etc. Additionally, method 500 may proceed with operation 520, where the one or more completion actions are performed by the client device.

In this way, the client device may implement data sharing actions according to instructions received from the server device.

Figure 6:
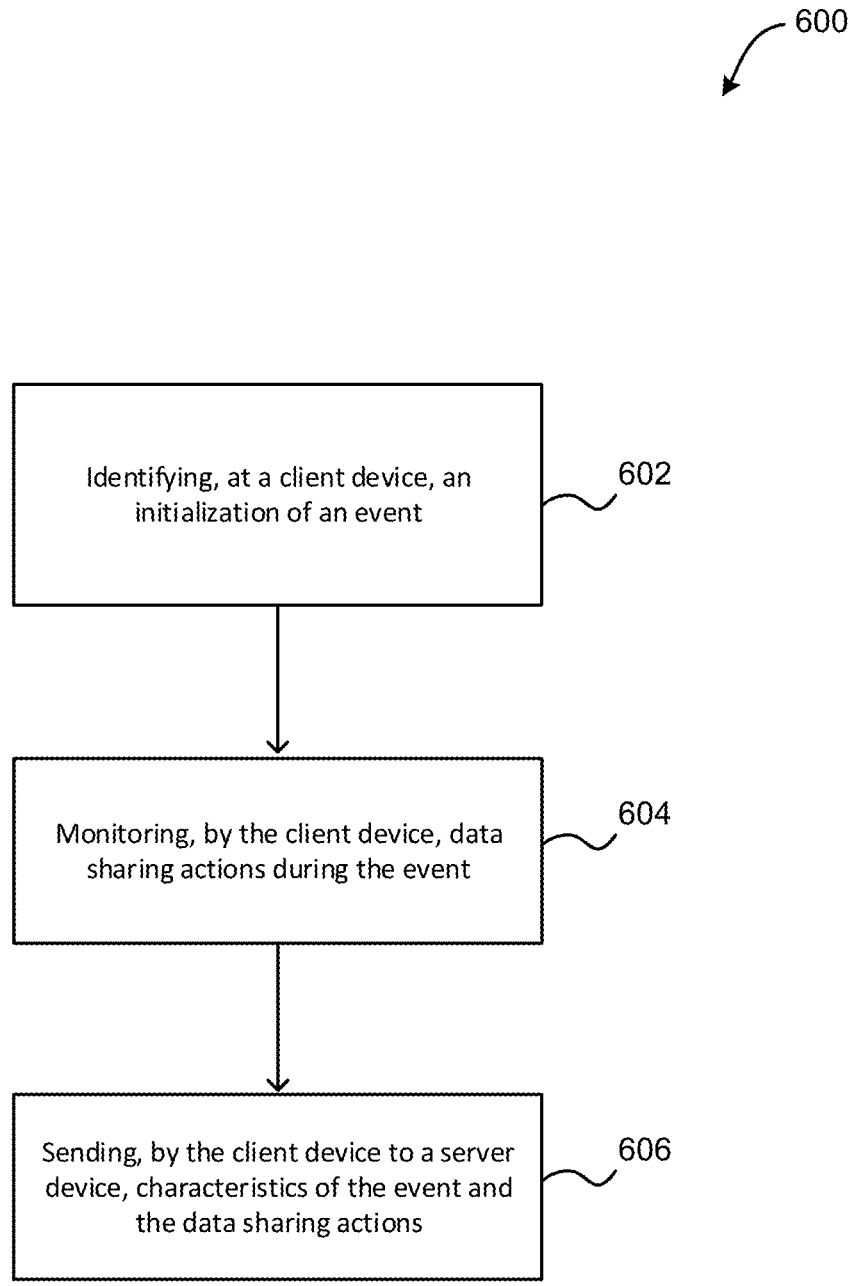
FIG. 6 illustrates a method for performing data sharing monitoring at a client device, in accordance with one embodiment.

Now referring to FIG. 6, a flowchart of a method 600 for performing data sharing monitoring at a client device is shown according to one embodiment. The method 600 may be performed in accordance with the present invention in any of the environments depicted in FIGS. 1-3 and 8-10, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a client device identifies an initialization of an event. In one embodiment, the event may be initialized by a user (e.g., by the user selecting one or more icons within a GUI, etc.). In another embodiment, the event may be initialized automatically, according to a schedule, etc.

Additionally, method 600 may proceed with operation 604, where data sharing actions are monitored by the client device during the event. Further, method 600 may proceed with operation 606, where characteristics of the event and the data sharing actions are sent from the client device to a server device.

Further, in one embodiment, the event may include one or more data sharing actions that are implemented automatically in response to the initialization of the event. In another embodiment, the event may include one or more data sharing actions that are implemented manually by a user during the event.

In this way, event monitoring may be performed by the client device in order to create data sharing information that can be saved as historical records and analyzed by the server device.

Figure 7:
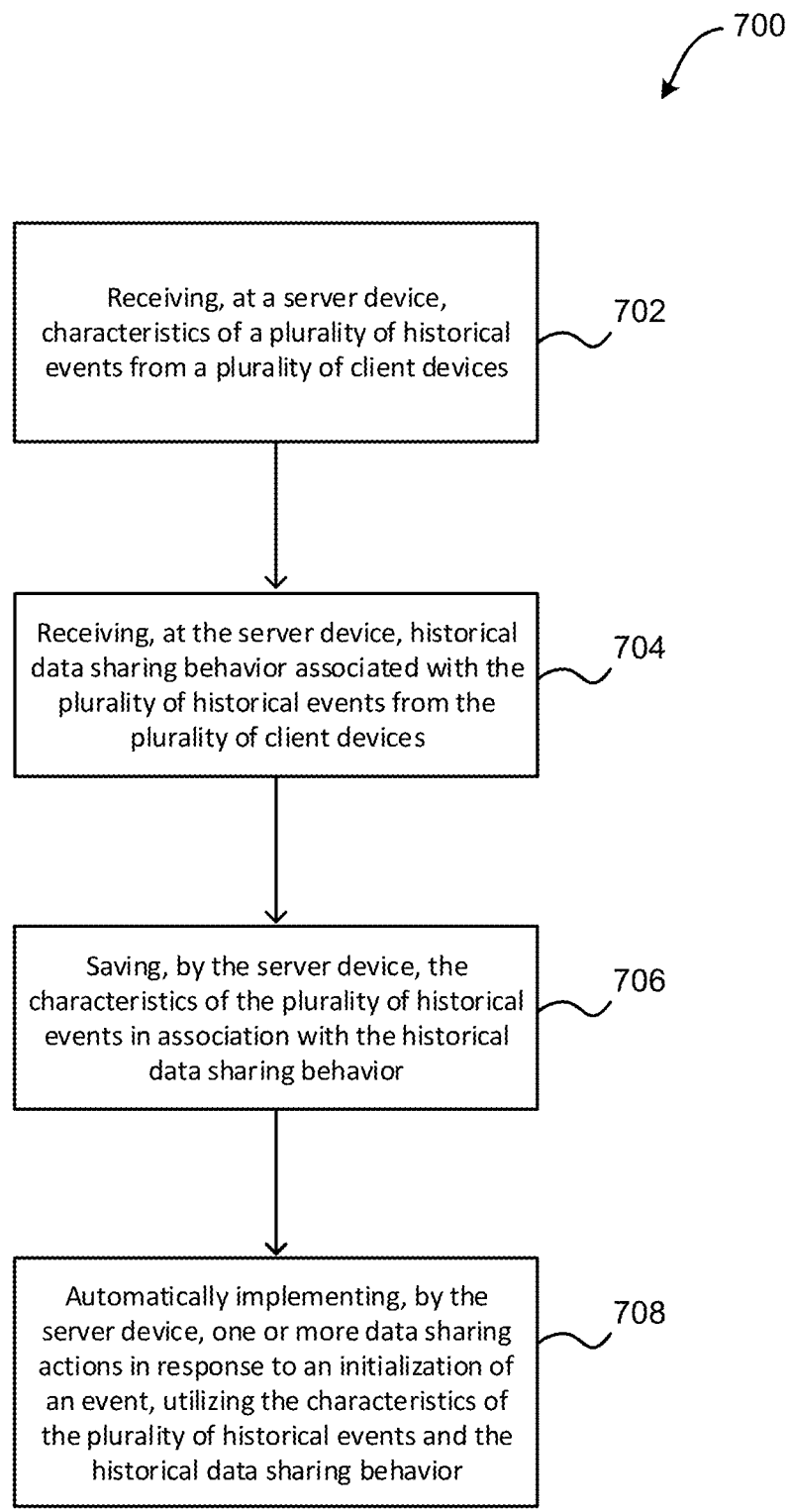
FIG. 7 illustrates a method for identifying and storing monitored historical data sharing behavior at a server device, in accordance with one embodiment.

Now referring to FIG. 7, a flowchart of a method 700 for identifying and storing monitored historical data sharing behavior at a server device is shown according to one embodiment. The method 700 may be performed in accordance with the present invention in any of the environments depicted in FIGS. 1-3 and 8-10, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where characteristics of a plurality of historical events are received at a server device from a plurality of client devices. In one embodiment, the characteristics of the plurality of historical events may be created by the plurality of client devices as a result of monitoring performed by the plurality of client devices. Additionally, method 700 may proceed with operation 704, where historical data sharing behavior associated with the plurality of historical events is received from the plurality of client devices at the server device.

In one embodiment, the historical data sharing behavior may include a creation of an instance of a meeting application in order to conduct a meeting with a plurality of users. In another embodiment, the historical data sharing behavior may include an invitation of one or more users to participate in the plurality of historical events. In yet another embodiment, the historical data sharing behavior may include running one or more applications that facilitate a sharing of data and sharing predetermined data with one or more users using the one or more applications.

Also, in one embodiment, the historical data sharing behavior may include a terminating of one or more applications at a predetermined time during the plurality of historical events. In another embodiment, the characteristics of the plurality of historical events may include one or more of a date that the plurality of historical events occurred, a time that the plurality of historical events occurred, a location where the plurality of historical events occurred, one or more users attending the plurality of historical events, etc.

Further, method 700 may proceed with operation 706, where the characteristics of the plurality of historical events are saved by the server device in association with the historical data sharing behavior. For example, the characteristics of the plurality of historical events may be saved by the server device and may be linked to the historical data sharing behavior. In one embodiment, both the characteristics of the plurality of historical events and the historical data sharing behavior may be linked by the server device to an identifier of the plurality of historical events within the server device. In another embodiment, the characteristics of the plurality of historical events may include results of monitoring performed by the plurality of client devices.

Further still, method 700 may proceed with operation 708, where the server device automatically implements one or more data sharing actions in response to an initialization of an event, utilizing the characteristics of the plurality of historical events and the historical data sharing behavior. In one embodiment, the event may be scheduled to occur at a future time. In another embodiment, the one or more data sharing actions may include one or more of sharing data during the plurality of historical events, initializing one or more applications during the plurality of historical events, terminating one or more actions during the plurality of historical events, selectively removing one or more users from one or more portions of the plurality of historical events, etc.

In this way, the server device may save the characteristics of the plurality of historical events to compare to characteristics of future events, and may save the historical data sharing behavior to be used to determine data sharing actions to be performed for future events.

Figure 8:
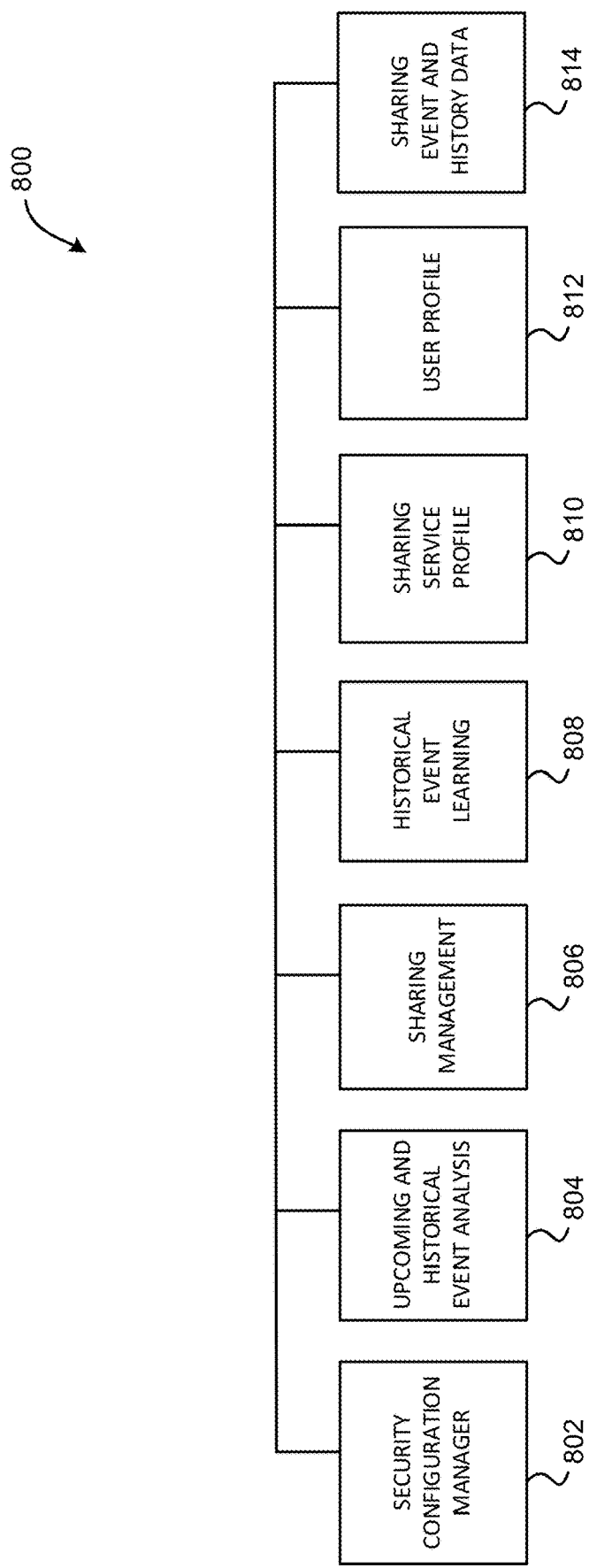
FIG. 8 illustrates an exemplary sharing service server, in accordance with one embodiment.

FIG. 8 illustrates an exemplary sharing service server 800, in accordance with one embodiment. As shown, the server 800 includes a security configuration manager 802. In one embodiment, the security configuration manager 802 may include a user interface for users to configure security settings of one or more user accounts for monitoring certain kinds of behavior data. In another embodiment, a user may configure a security rule for a sharing level utilizing the security configuration manager 802.

Additionally, the server 800 includes an upcoming and historical event analysis module 804. In one embodiment, the upcoming and historical event analysis module 804 may include an algorithm to check to see if there are the same or similar characteristics between an event and one or more historical cataloged events. As a result, the system may know the sharing behavior of similar historical events for reference.

Further, the server 800 includes a sharing management module 806. In one embodiment, the sharing management module 806 may include a program for initiating a sharing session according to the output of the upcoming and historical event analysis module 804, monitoring the sharing session and updating a sharing session status, and terminating a sharing session if the server finds that the sharing activity should be ended.

Further still, the server 800 includes an historical event learning module 808. In one embodiment, the historical event learning module 808 may include one or more components for analyzing and learning historical sharing behavior based on a correlation between sharing operations and events.

Also, the server 800 includes a sharing service profile 810. In one embodiment, the sharing service profile 810 may include a record file or database for saving vendor's service settings. In one embodiment, the sharing service profile 810 may include may include a predefined behavior learning methodology and an event analysis algorithm.

In addition, the server 800 includes a user profile 812. In one embodiment, the user profile 812 may include a record file or database for saving user data, which may include security configuration for monitoring and sharing. Furthermore, the server 800 includes sharing event and history data 814. In one embodiment, the sharing event and history data 814 may include a record file or database for saving previous sharing behavior for a user. In another embodiment, the sharing event and history data 814 may include the sharing details and correlated event that caused the sharing.

Figure 9:
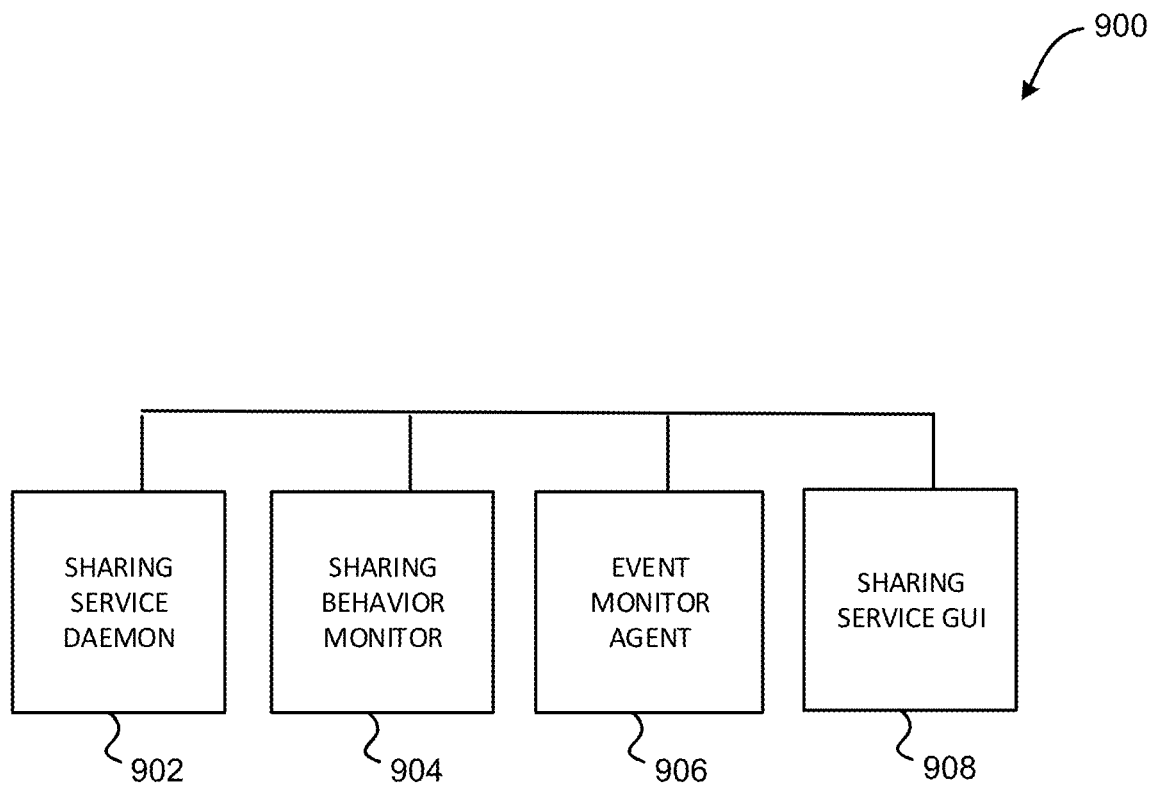
FIG. 9 illustrates an exemplary sharing service client, in accordance with one embodiment.

FIG. 9 illustrates an exemplary sharing service client 900, in accordance with one embodiment. As shown, the client 900 includes a sharing service daemon 902. In one embodiment, the sharing service daemon 902 may include a sharing service management program on the client device to manage any sharing related service. Additionally, the client 900 includes a sharing behavior monitor 904. In one embodiment, the sharing behavior monitor 904 may include one or more software modules (e.g., event handlers, etc.) for tracking and detecting sharing behavior and events.

Further, the client 900 includes an event monitor agent 906. In one embodiment, the event monitor agent 906 may include a subroutine to send the sharing behavior and event to a sharing service server. For example, with the upcoming event sent, the server may trigger one or more sharing service operations. In another embodiment, the event monitor agent 906 may also receive sharing service instructions from server to initiate or terminate a sharing session.

Further still, the client 900 includes a sharing service GUI 908. In one embodiment, the sharing service GUI 908 may include a GUI program for a user to launch and/or terminate a sharing session, share material/a screen and invite one or more participants.

Figure 10:
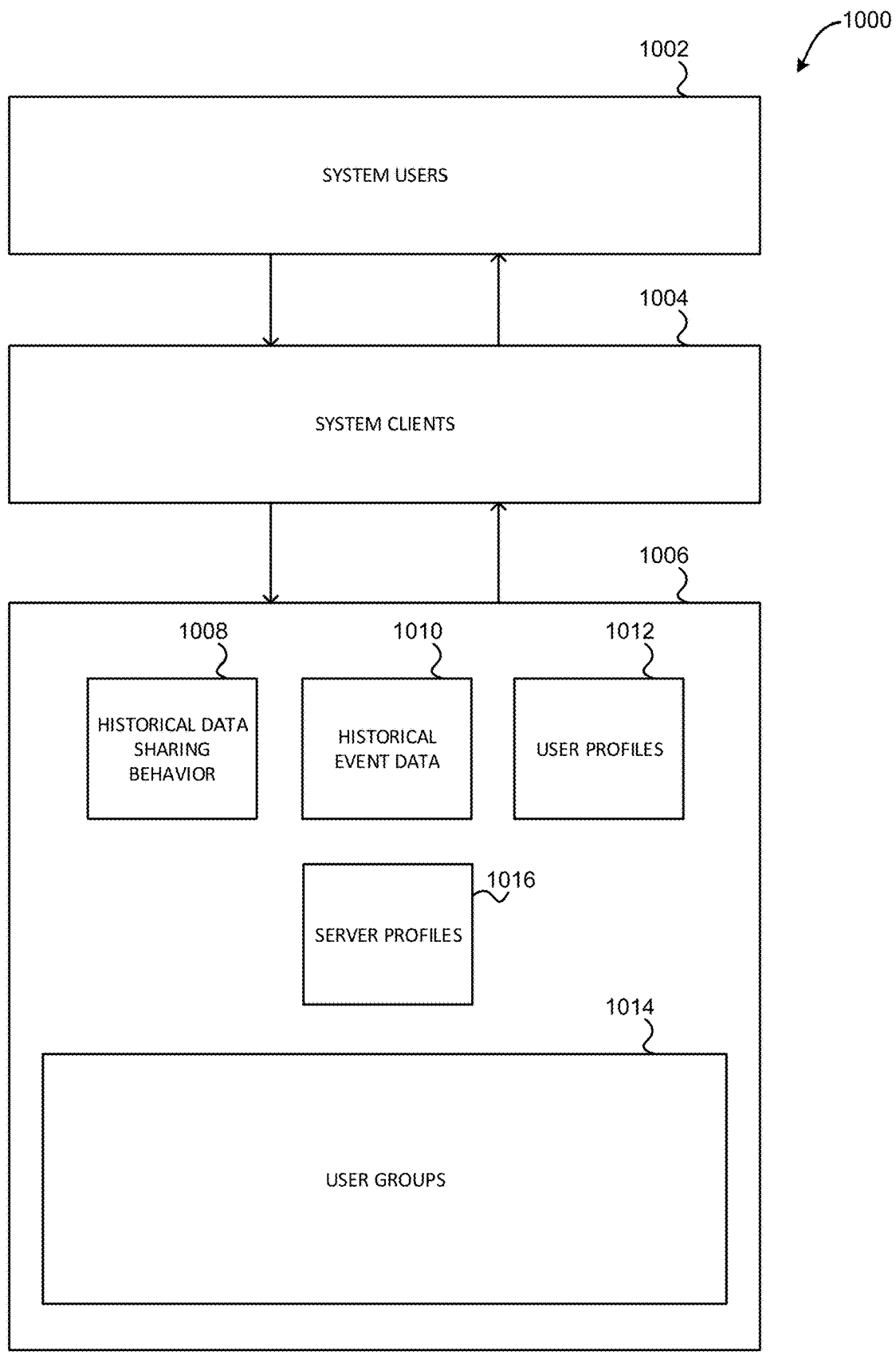
FIG. 10 illustrates an exemplary dynamic data sharing service environment, in accordance with one embodiment.

FIG. 10 illustrates an exemplary dynamic data sharing service environment 1000, in accordance with one embodiment. As shown, the environment 1000 includes a plurality of users 1002 in communication with a plurality of system clients 1004. Additionally, the plurality of system clients 1004 is in communication with a system server 1006.

In one embodiment, the one or more system clients 1004 may monitor the data sharing behavior of the plurality of users 1002 during one or more events. The one or more system clients 1004 may also determine one or more characteristics of the events. The one or more system clients 1004 may then send the historic data sharing behavior of the plurality of users and the one or more characteristics of the historic events to the system server 1006.

The system server 1006 may then save the data sharing behavior of the plurality of users 1002 in a historical data sharing behavior database 1008, and may save the one or more characteristics of the events (as well as identifiers of the events themselves) in the historical event data database 1010. Stored data sharing behavior of the plurality of users 1002 in the in a historical data sharing behavior database 1008 may be linked to associated event characteristics in the historical event data database 1010, and both may be linked to user profile data stored in a user profiles database 1012.

Additionally, in one embodiment, the system server 1006 may analyze the data sharing behavior of the plurality of users 1002 that is stored in the historical data sharing behavior database 1008, and may create a plurality of groups of system users 1014 based on the analysis. In another embodiment, each of the groups of system users 1014 may indicate a subset of the plurality of users 1002 that was given access to data during a particular historical event. In yet another embodiment, each of the plurality of groups of system users 1014 may be linked to a predetermined historical event stored in the historical event data database 1010.

Further, in one embodiment, the system server 1006 may identify an event that is scheduled to occur in the future. The system server 1006 may then compare characteristics of the event to characteristics stored in the historical event data database 1010 in order to identify an historical event that matches the event scheduled to occur. The system server 1006 may then identify data sharing behavior stored in the historical data sharing behavior database 1008 as well as a user group stored within the groups of system users 1014 that is linked to the matching historical event.

Further still, utilizing the linked data sharing behavior and user group, the system server 1006 may then determine instructions for implementing one or more data sharing actions. When the event is scheduled to occur, these instructions may be sent to one or more of the plurality of system clients 1004, which may then implement the instructions for one or more of the plurality of users 1002. During the implementation of the one or more data sharing actions, one or more of the plurality of system clients 1004 may again monitor the data sharing behavior of the plurality of users 1002 during the event and may send the results of the monitoring back to the system server 1006. Also, the system server 1006 may operate according to one or more settings stored in a server profiles database 1016.

In this way, data sharing security may be improved, and the data sharing experience may be enhanced intelligently. Further, user data sharing mistakes may be eliminated, and user experience and productivity may be improved.

In one embodiment, a user may have a weekly review meeting. During the first few meetings, the user may start a sharing session to a plurality of other users for displaying disclosures and presentation files, may open a group chat session for voting and discussion, and then may close the all sessions. A sharing service daemon may learn and catalog this historical sharing behavior and may correlate the sharing behavior with a meeting event, and the plurality of users.

Additionally, before a new meeting, a monitor module may detect an event of an upcoming meeting. An analysis module may find that the upcoming meeting has the same characteristics as previous meeting events according to historical records. A sharing management module may then automatically launch one or more sharing sessions based on the historical shared behavior. The sharing management module may also terminate all sharing sessions after the meeting.

In another embodiment, a project manager may press a single button from a conference meeting management GUI to start a weekly status meeting for a first project (e.g., a web conference, a phone call (e.g., VOIP), chat, etc.). In one example, the system may automatically start one or more of these operations. If the system detects any offline invited attendees, it may send a message to remind them to attend the meeting.

Additionally, the system may automatically switch to a second meeting for the user according to a system learned profile of a second project. The system may automatically hang everything up for the user after the first project meeting and may save one or more log files describing the meeting into a cataloged history directory. If the first project meeting runs over into the second meeting time space, the system may automatically provide a notification (e.g., a "Be there in 5 minutes" message, etc.) to users in the second meeting. The system may also display an alert message to the project manager about details of the second meeting (e.g., "5 of the 6 attendees of the second meeting are now present," etc.).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
  identifying a scheduling of an event at a future time by monitoring a calendar application utilizing a server device;
  prior to an occurrence of the scheduled event:
    determining, utilizing the server device, a match between the scheduled event and an historical event based on characteristics of the scheduled event, including:
      analyzing the scheduled event to determine characteristics of the scheduled event, including a date that the scheduled event is to occur, a time that the scheduled event is to occur, a location where the scheduled event is to occur, and a plurality of users attending the scheduled event, comparing the characteristics of the event to characteristics of a plurality of stored historical events, and determining that a predetermined number of the characteristics of the scheduled event match a predetermined number of characteristics of the historical event;

identifying historical data sharing behavior associated with the historical event, utilizing the server device, the historical data sharing behavior including:

an alteration of a shared data access level of one of the plurality of users during a portion of the historical event, a running of a file sharing application, a termination of sensitive communications applications at a start of the historical event, a sharing of predetermined data with one or more users, and an enabling and altering one or more security settings within one or more data sharing applications;

determining, by the server device, one or more data sharing actions to be performed during the scheduled event, utilizing the historical data sharing behavior, the one or more data sharing actions including:

sharing predetermined data with one or more users during the scheduled event, and enabling and altering one or more security settings within one or more data sharing applications during the event; and automatically implementing the one or more data sharing actions in response to an initialization of the scheduled event, utilizing the server device, including automatically removing the one of the plurality of users from a file sharing application at a predetermined time during the scheduled event, and automatically sending to one or more client devices instructions to display one or more selectable icons to perform predetermined actions.

2. The computer-implemented method of claim 1, wherein automatically removing the one of the plurality of users from the file sharing application includes automatically altering the shared data access level of the one of the plurality of users.

3. The computer-implemented method of claim 1, wherein automatically removing the one of the plurality of users from the file sharing application includes automatically sending to a client device instructions to alter the shared data access level for the one of the plurality of users.

4. The computer-implemented method of claim 1, further comprising selecting file data to be shared during the scheduled event, based on the file data shared during the historical event.

5. The computer-implemented method of claim 1, wherein the historical data sharing behavior further includes a creation of an instance of a meeting application in order to conduct a meeting with a plurality of users.

6. The computer-implemented method of claim 1, wherein the historical data sharing behavior further includes an invitation of one or more users to participate in the historical event.

7. The computer-implemented method of claim 1, wherein the historical data sharing behavior further includes running one or more applications that facilitate a sharing of data and sharing predetermined data with one or more users using the one or more applications.

8. The computer-implemented method of claim 1, further comprising storing the historical data sharing behavior in association with the historical event.

9. The computer-implemented method of claim 1, wherein determining the one or more data sharing actions to be performed during the scheduled event includes determining a group of users to invite to the scheduled event.

10. The computer-implemented method of claim 1, wherein the one or more data sharing actions include:

sharing data during the scheduled event;

initializing one or more applications during the scheduled event; and terminating one or more actions during the scheduled event.

11. The computer-implemented method of claim 1, wherein:

the historical data sharing behavior associated with the historical event includes:

a running of a screen capture sharing application, and a termination of sensitive emails at the start of the historical event, and the one or more data sharing actions to be performed during the scheduled event include:

sharing screenshot data, running one or more applications, where a time to run one or more of the applications is determined based on times that the applications were run during the historical event, and terminating one or more of the applications at a predetermined time during the scheduled event, based on times that the one or more applications were terminated during the historical event.

12. The computer-implemented method of claim 1, wherein the historical data sharing behavior further includes:

a sharing of predetermined data with one or more users, and an enabling and altering one or more security settings within one or more data sharing applications, the one or more data sharing actions include:

sharing predetermined data with one or more users during the scheduled event, and enabling and altering one or more security settings within one or more data sharing applications during the event, and wherein automatically implementing the one or more data sharing actions includes automatically sending to one or more client devices instructions to display one or more selectable icons to perform predetermined actions.

13. The computer-implemented method of claim 1, wherein:

the scheduled event is identified by monitoring a calendar application, wherein determining the match includes:

analyzing the scheduled event to determine characteristics of the scheduled event, including a date that the scheduled event is to occur, a time that the scheduled event is to occur, and a location where the scheduled event is to occur, comparing the characteristics of the event to characteristics of a plurality of stored historical events, and determining that a predetermined number of the characteristics of the scheduled event match a predetermined number of characteristics of the historical event, and wherein the historical data sharing behavior further includes:

a sharing of predetermined data with one or more users, and an enabling and altering one or more security settings within one or more data sharing applications.

14. A computer-implemented method, comprising:

identifying a scheduling of an event at a future time, utilizing a server device;

prior to an occurrence of the scheduled event:

determining a match between the scheduled event and an historical event based on characteristics of the scheduled event, including a plurality of users attending the scheduled event, utilizing the server device, identifying historical data sharing behavior associated with the historical event, utilizing the server device, the historical data sharing behavior including:

an alteration of a shared data access level of one of the plurality of users during a portion of the historical event, a running of a file sharing application, and a termination of sensitive communications applications at a start of the historical event;

determining, by the server device, one or more data sharing actions to be performed during the scheduled event, utilizing the historical data sharing behavior; and automatically implementing the one or more data sharing actions in response to an initialization of the scheduled event, utilizing the server device, including automatically removing the one of the plurality of users from a file sharing application at a predetermined time during the scheduled event, wherein the scheduled event is identified by monitoring a calendar application, wherein determining the match includes:

analyzing the scheduled event to determine characteristics of the scheduled event, including a date that the scheduled event is to occur, a time that the scheduled event is to occur, and a location where the scheduled event is to occur, comparing the characteristics of the event to characteristics of a plurality of stored historical events, and determining that a predetermined number of the characteristics of the scheduled event match a predetermined number of characteristics of the historical event, wherein the historical data sharing behavior further includes:

a sharing of predetermined data with one or more users, and an enabling and altering one or more security settings within one or more data sharing applications, wherein the one or more data sharing actions include:

sharing predetermined data with one or more users during the scheduled event, and enabling and altering one or more security settings within one or more data sharing applications during the event, and wherein automatically implementing the one or more data sharing actions includes automatically sending to one or more client devices instructions to display one or more selectable icons to perform predetermined actions.

15. A computer program product for managing dynamic data sharing, the computer program product comprising a non-transitory computer readable storage medium having program instructions embodied therewith, the program instructions executable by a processor to cause the processor to perform a method comprising:

identifying a scheduling of an event at a future time, utilizing the processor;

prior to an occurrence of the scheduled event:

determining a match between the scheduled event and an historical event based on characteristics of the scheduled event, including a plurality of users attending the scheduled event, utilizing the processor, identifying historical data sharing behavior associated with the historical event, utilizing the processor, the historical data sharing behavior including:

an alteration of a shared data access level of one of the plurality of users during a portion of the historical event, a running of a file sharing application, and a termination of sensitive communications applications at a start of the historical event;

determining, utilizing the processor, one or more data sharing actions to be performed during the scheduled event, utilizing the historical data sharing behavior; and automatically implementing the one or more data sharing actions in response to an initialization of the scheduled event, utilizing the processor, including automatically removing the one of the plurality of users from a file sharing application at a predetermined time during the scheduled event, wherein the scheduled event is identified by monitoring a calendar application, wherein determining the match includes:

analyzing the scheduled event to determine characteristics of the scheduled event, including a date that the scheduled event is to occur, a time that the scheduled event is to occur, and a location where the scheduled event is to occur, comparing the characteristics of the event to characteristics of a plurality of stored historical events, and determining that a predetermined number of the characteristics of the scheduled event match a predetermined number of characteristics of the historical event, wherein the historical data sharing behavior further includes:

a sharing of predetermined data with one or more users, and an enabling and altering one or more security settings within one or more data sharing applications, wherein the one or more data sharing actions include:

sharing predetermined data with one or more users during the scheduled event, and enabling and altering one or more security settings within one or more data sharing applications during the event, and wherein automatically implementing the one or more data sharing actions includes automatically sending to one or more client devices instructions to display one or more selectable icons to perform predetermined actions.

16. The computer program product of claim 15, wherein removing the one of the plurality of users includes altering one or more access levels of the user during the event.

17. The computer program product of claim 15, wherein determining the match includes identifying the characteristics of the scheduled event.

18. The computer program product of claim 15, wherein determining the match includes comparing the characteristics of the scheduled event to one or more characteristics of a plurality of stored historical events.

19. The computer program product of claim 15, wherein the historical data sharing behavior further includes a creation of an instance of a meeting application in order to conduct a meeting with a plurality of users.

20. The computer program product of claim 15, wherein the historical data sharing behavior further includes an invitation of one or more users to participate in the historical event.

21. The computer program product of claim 15, wherein the historical data sharing behavior further includes running one or more applications that facilitate a sharing of data and sharing predetermined data with one or more users using the one or more applications.

22. A computer-implemented method, comprising:
identifying a scheduling of an event at a future time, utilizing a server device;
prior to an occurrence of the scheduled event:
  determining a match between the scheduled event and an historical event based on characteristics of the scheduled event, including a plurality of users attending the scheduled event, utilizing the server device,
  identifying historical data sharing behavior associated with the historical event, utilizing the server device, the historical data sharing behavior including:
    an alteration of a shared data access level of one of the plurality of users during a portion of the historical event,
    a running of a file sharing application, and
    a termination of sensitive communications applications at a start of the historical event;
  determining, by the server device, one or more data sharing actions to be performed during the scheduled event, utilizing the historical data sharing behavior;
  automatically implementing the one or more data sharing actions in response to an initialization of the scheduled event, utilizing the server device, including automatically removing the one of the plurality of users from a file sharing application at a predetermined time during the scheduled event;
  comparing a security level of one of the users to a threshold security level to determine whether to invite the user to the scheduled event;
  wherein the historical data sharing behavior associated with the historical event includes:
    a running of a screen capture sharing application, and
    a termination of sensitive emails at the start of the historical event;
  wherein the one or more data sharing actions to be performed during the scheduled event include:
    sharing screenshot data,
    running one or more applications, where a time to run one or more of the applications is determined based on times that the applications were run during the historical event, and
    terminating one or more of the applications at a predetermined time during the scheduled event, based on times that the one or more applications were terminated during the historical event;
  wherein the predetermined time during the scheduled event at which the one of the plurality of users is removed from the file sharing application is based on a time that the one of the plurality of users was removed from the file sharing application during the historical event;
  wherein automatically implementing the one or more data sharing actions includes sending to one or more client devices instructions to display to a user one or more selectable icons to perform predetermined actions within a graphical user interface (GUI).

23. A computer-implemented method, comprising:
identifying a scheduling of an event at a future time, utilizing a server device;
prior to an occurrence of the scheduled event:
determining a match between the scheduled event and an historical event based on characteristics of the scheduled event, including a plurality of users attending the scheduled event, utilizing the server device,
comparing a security level of a first user of the plurality of users to a threshold security level to determine whether to invite the first user to the scheduled event,
identifying historical data sharing behavior associated with the historical event, utilizing the server device, the historical data sharing behavior including:
an alteration of a shared data access level of one of the plurality of users during a portion of the historical event,
a running of a file sharing application and a running of a screen capture sharing application, and
a termination of sensitive communications applications and sensitive emails at a start of the historical event, and
determining, by the server device, one or more data sharing actions to be performed during the scheduled event, utilizing the historical data sharing behavior, the one or more data sharing actions including:
sharing screenshot data,
running one or more applications, where a time to run one or more of the applications is determined based on times that the applications were run during the historical event, and
terminating one or more of the applications at a second predetermined time during the scheduled event, based on times that the one or more applications were terminated during the historical event; and
automatically implementing the one or more data sharing actions in response to an initialization of the scheduled event, utilizing the server device, including:
sending to one or more client devices instructions to display to a user one or more selectable icons to perform predetermined actions within a graphical user interface (GUI), and
automatically removing the one of the plurality of users from a file sharing application at the second predetermined time during the scheduled event.

* * * * *